United States Patent
Wu et al.

(10) Patent No.: US 10,286,489 B2
(45) Date of Patent: May 14, 2019

(54) APPARATUS AND METHOD FOR LASER CUTTING USING A SUPPORT MEMBER HAVING A GOLD FACING LAYER

(75) Inventors: Pingfan Wu, Woodbury, MN (US); Moses M. David, Woodbury, MN (US); Bruce E. Tait, Woodbury, MN (US); Schoen A. Schuknecht, Hudson, WI (US); Steven D. Theiss, Woodbury, MN (US); Charles J. Studiner, IV, Cottage Grove, MN (US); Donovan C. C. Karg, Jr., Vadnais Heights, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 821 days.

(21) Appl. No.: 13/976,514

(22) PCT Filed: Dec. 29, 2011

(86) PCT No.: PCT/US2011/067909
§ 371 (c)(1),
(2), (4) Date: Jun. 27, 2013

(87) PCT Pub. No.: WO2012/092499
PCT Pub. Date: Jul. 5, 2012

(65) Prior Publication Data
US 2013/0270239 A1    Oct. 17, 2013

Related U.S. Application Data

(60) Provisional application No. 61/428,391, filed on Dec. 30, 2010.

(51) Int. Cl.
*B23K 26/08* (2014.01)
*B23K 26/38* (2014.01)
(Continued)

(52) U.S. Cl.
CPC ...... *B23K 26/0846* (2013.01); *B23K 26/0838* (2013.01); *B23K 26/38* (2013.01);
(Continued)

(58) Field of Classification Search
CPC ............ B23K 2201/16; B23K 2203/16; B23K 26/0838; B23K 26/0846; B23K 26/38;
(Continued)

(56) References Cited

U.S. PATENT DOCUMENTS

| 2,017,094 A | 10/1935 | Hetzel |
| 3,610,724 A | 10/1971 | William |

(Continued)

FOREIGN PATENT DOCUMENTS

| CN | 1420008 | 5/2003 |
| CN | 101123169 | 2/2008 |

(Continued)

OTHER PUBLICATIONS

International Search Report for PCT International Application No. PCT/US2011/067909, dated May 11, 2012, 4 pages.

*Primary Examiner* — Dana Ross
*Assistant Examiner* — Joseph W Iskra
(74) *Attorney, Agent, or Firm* — Eloise J. Maki; Gregory D. Allen; Robert H. Jordan

(57) ABSTRACT

The present application relates to an apparatus (52) for supporting sheet material during cutting by laser radiation comprising a support member (42) having a gold facing layer. A method for cutting sheet material using such apparatus is also defined.

14 Claims, 2 Drawing Sheets

(51) Int. Cl.
  *B23K 26/40* (2014.01)
  *B23K 101/16* (2006.01)
  *B23K 103/00* (2006.01)
  *B23K 103/16* (2006.01)

(52) U.S. Cl.
  CPC .......... *B23K 26/40* (2013.01); *B23K 2101/16* (2018.08); *B23K 2103/172* (2018.08); *B23K 2103/42* (2018.08); *B23K 2103/50* (2018.08)

(58) Field of Classification Search
  CPC .......... B23K 2203/172; B23K 2203/42; B23K 26/40; B23K 26/402; B23K 26/4065; B23K 26/409
  USPC .......................................... 219/121.72, 121.82
  See application file for complete search history.

(56) References Cited

U.S. PATENT DOCUMENTS

| | | | |
|---|---|---|---|
| 3,626,143 | A | 12/1971 | Fry |
| 3,790,744 | A | 2/1974 | Bowen |
| 3,871,739 | A | 3/1975 | Poulsen |
| 4,323,757 | A | 4/1982 | Oka |
| 4,446,305 | A | 5/1984 | Rogers |
| 4,540,623 | A | 9/1985 | Im |
| 4,678,180 | A | 7/1987 | Tamura et al. |
| 4,997,178 | A | 3/1991 | Ogoda |
| 5,010,231 | A | 4/1991 | Huizinga |
| 5,103,337 | A | 4/1992 | Schrenk |
| 5,225,852 | A | 7/1993 | Uchida et al. |
| 5,360,659 | A | 11/1994 | Arends |
| 5,382,773 | A * | 1/1995 | Kurihara ............ B23K 26/0661 219/121.7 |
| 5,448,404 | A | 9/1995 | Schrenk |
| 5,882,774 | A | 3/1999 | Jonza |
| 6,036,566 | A | 3/2000 | Baldi |
| 6,103,050 | A | 8/2000 | Krueger |
| 6,157,490 | A | 12/2000 | Wheatley |
| 6,191,382 | B1 | 2/2001 | Damikolas |
| 6,303,901 | B1 | 10/2001 | Perry |
| 6,368,699 | B1 | 4/2002 | Gilbert |
| 6,465,950 | B1 | 10/2002 | Baldi |
| 6,493,014 | B2 | 12/2002 | Aroneo |
| 6,539,625 | B2 | 4/2003 | Engel |
| 6,696,157 | B1 | 2/2004 | David |
| 6,737,154 | B2 | 5/2004 | Jonza |
| 6,833,528 | B2 | 12/2004 | De Steur |
| 6,991,695 | B2 | 1/2006 | Tait |
| 7,396,493 | B2 | 7/2008 | Tait |
| 7,832,677 | B2 | 11/2010 | Lannes et al. |
| 7,852,560 | B2 | 12/2010 | Ouderkirk |
| 8,445,813 | B2 | 5/2013 | Lupinetti et al. |
| 2001/0052659 | A1 | 12/2001 | Nakai |
| 2002/0097297 | A1 | 7/2002 | Skinner |
| 2003/0217806 | A1 | 11/2003 | Tait |
| 2004/0151056 | A1 | 8/2004 | Omtveit |
| 2008/0057718 | A1 * | 3/2008 | Omata ............... B23K 26/0676 438/694 |
| 2008/0179304 | A1 | 7/2008 | Osako |
| 2008/0263841 | A1 | 10/2008 | Stelzl |
| 2009/0123740 | A1 | 5/2009 | Hanaki |
| 2010/0162864 | A1 | 7/2010 | Kozasa |
| 2012/0028404 | A1 * | 2/2012 | Frey .................. B23K 26/0063 438/80 |

FOREIGN PATENT DOCUMENTS

| | | |
|---|---|---|
| JP | 3-5091 | 1/1991 |
| JP | 2002-241954 | 8/2002 |
| JP | 2002241954 * | 8/2002 |
| JP | 2003-300324 | 10/2003 |
| JP | 2004-298885 | 10/2004 |
| JP | 2004343011 A | 12/2004 |
| JP | 2010-514571 | 5/2010 |
| TW | 2010/28238 | 8/2010 |
| WO | WO 1995-17303 | 6/1995 |
| WO | WO 1999-36248 | 7/1999 |
| WO | WO 1999-39224 | 8/1999 |
| WO | WO 2007/026326 | 3/2007 |

* cited by examiner

APPARATUS AND METHOD FOR LASER CUTTING USING A SUPPORT MEMBER HAVING A GOLD FACING LAYER

FIELD

This invention relates to an apparatus for laser cutting, i.e., using laser radiation for converting, sheets such optical films and a method for using such apparatus.

BACKGROUND

Multilayer optical films have been demonstrated by coextrusion of alternating polymer layers. For example, U.S. Pat. No. 3,610,724 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.) each disclose multilayer optical films. In these polymeric multilayer optical films, polymer materials are used predominantly or exclusively in the makeup of the individual layers. Such films are compatible with high volume manufacturing processes, and can be made in large sheet and roll formats. An illustrative embodiment is shown in FIG. 1.

In typical constructions, the film bodies comprise one or more layers of such multilayer optical films, sometimes referred to as an "optical stack", and further protective layers on one or both sides thereof. Illustrative protective layers include, e.g., so-called "skin layers" on one or both sides comprising more robust materials, e.g., polycarbonate or polycarbonate blends, which impart desired additional mechanical, optical, or chemical properties to the construction. U.S. Pat. No. 6,368,699 (Gilbert et al.) and U.S. Pat. No. 6,737,154 (Jonza et al.) disclose illustrative examples thereof. It is also common to further include additional outer layers for protection, e.g., removable buffer layers sometimes referred to as "premask layers" which protect the film body during early handling and processing and are then removed during later manufacturing steps. Illustrative examples include polyethylene-based films and polyurethane-based films. An illustrative embodiment is shown in FIG. 2.

Many product applications, however, require relatively small and numerous pieces of film. For these applications, small pieces of multilayer optical film can be obtained from a larger sheet of such film by subdividing the sheet by mechanical means, such as by cutting the sheet with a shearing device (e.g., a scissors), or slitting the sheet with a blade, or cutting with other mechanical apparatus (e.g., die stamps and guillotines). However, the forces exerted on the film by the cutting mechanism can cause layer delamination in a region along the cut line or edge of the film. This is particularly true for many polymeric multilayer optical films. The resultant delamination region is often discernable by a discoloration relative to intact areas of the film. Because the multilayer optical film relies on intimate contact of the individual layers to produce the desired reflection/transmission characteristics, as a result of degradation in the delamination region it fails to provide those desired characteristics. In some product applications, the delamination may not be problematic or even noticeable. In others, particularly where it is important for substantially the entire piece of film from edge-to-edge to exhibit the desired reflection or transmission characteristics, or where the film can be subjected to mechanical stresses and/or wide temperature variations that could cause the delamination to propagate in the film over time, the delamination can be highly detrimental.

U.S. Pat. No. 6,991,695 (Tait et al.) discloses a method for using laser radiation to cut or subdivide optical films using, inter alia, removable liners to support the film and cut pieces. Though laser converting of polymeric materials has been known for some time, see, e.g., U.S. Pat. No. 5,010,231 (Huizinga) and U.S. Pat. No. 6,833,528 (De Steur et al.), improvements in regard to laser conversion of optical film bodies are desired.

A typical apparatus will include a laser radiation source that emits suitable laser radiation for the material being cut and a support member for supporting the material in desired orientation to the laser radiation source, e.g., in flat orientation within the effective focus zone. Because of the relatively thin nature of optical films and the narrow field of focus of laser radiation which is used it is important in many instances that the material be held in flat orientation during laser irradation. Stainless steel support members are well known for such use, in part because of the consistently flat configuration which can be attained. Also, it is well known to use support members in a belt configuration to achieve greater operational efficiency and utility.

However, stainless steel can be difficult to keep clean and due to its absorbance characteristics is subject to formation of hot spots which can result in damage to the stainless steel support member or material being cut.

Accordingly, improved support members are desired for laser converting operations, e.g., for use in laser conversion of optical films.

SUMMARY

The present invention provides an apparatus for laser converting, i.e., cutting, sheet material and a method for converting sheet sheet using such apparatus. The method provides numerous advantages including improved effectiveness and efficiency of laser converting of sheet materials such as optical films.

In brief summary, the apparatus of the invention is a laser irradiation station that comprises, inter alia, a support member comprising a backing having and a gold facing layer on a major surface thereof. We have found that such support members provide a number of advantages when used to support work pieces such as optical films when being laser converted.

In addition, a method for using such support members while laser converting sheet materials is provided as described below.

We have found that using support members as described herein provides surprising advantages in laser converting of sheet materials, particularly optical films. In precise manufacturing processes such as the conversion of optical films the film must lie on a flat surface in a dimensionally and configurationally stable fashion. In order to obtain desired fine cutting, the laser radiation is finely focused with a limited depth of focus.

BRIEF DESCRIPTION OF DRAWING

The invention is further explained with reference to the drawing wherein.

These figures are not to scale and are intended to be merely illustrative and not limiting.

DETAILED DESCRIPTION OF ILLUSTRATIVE EMBODIMENTS

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Support Member

Figure 3:
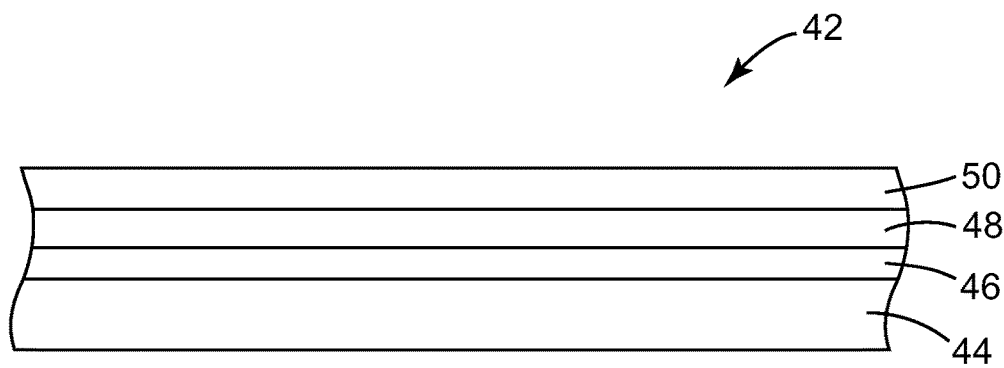
FIG. 3 is a cross sectional diagram of an illustrative support member of the invention.

A cross section of an illustrative support member 42 of the invention is shown in FIG. 3. In this embodiment, support member 42 comprises backing 44 having first and second major faces. On the first major face thereof is, in order, optional tie layer 46, gold facing layer 48, and optional low surface energy coating 50.

The support member may be in any desired configuration, e.g., simple platen, tray, etc. though a continuous belt configuration is typically preferred for operational efficiencies.

Backing 44 typically provides much of the structural integrity of support member 42, imparting sufficient strength, dimensional stability, etc. to permit support member 42 with the sheet material being converted supported thereon, to be manipulated through the converting process. In a preferred embodiment the support member is in the form of a continuous belt that is sufficiently flexible to wind through the apparatus while exhibiting sufficient tensile strength and dimensional stability for tension to be applied thereto (e.g., over tension rollers) to yield a flat converting zone. While those skilled in the art can select other suitable materials for backing 44, stainless steel (e.g., 316 stainless steel) is typically preferred.

In preferred embodiments, one or more tie layers 46 are provided between gold facing layer 48 and backing 44. Such tie layers can be used to enhance the adhesion between backing 44 and gold facing layer 48 as well impart increased hardness and scratch resistance to the gold layer. Illustrative examples of suitable tie layer materials include titanium nitride, zirconium nitride, titanium aluminum nitride, and combinations thereof.

In some embodiments, hardening additives such as cobalt can be incorporated in the gold facing layer to increase its hardness and scratch resistance without undesirably impairing its reflective characteristics.

The gold layer is referred to as a facing layer because in use during application of laser radiation to a sheet material being converted, laser radiation that passes through the sheet material as it is cut through, or between successive portions of sheet material if the beam is not pulsed off, is incident to the gold layer rather than the underlying backing or tie layer, if any. The gold facing layer is in the intended optical path of the laser radiation, shielding the underlying components of the support member, e.g, backing, etc.

In some embodiments, the gold facing layer may cover essentially the entire face of the backing In other embodiments, the gold facing layer does not completely cover the entire face of the backing, e.g., one or more side edges of the support member may be uncovered, e.g., to provide portions that can be gripped for handling without contacting the gold facing layer.

We have discovered that use of gold facing layers as described herein provides several surprising advantages, particularly when carrying out laser converting of optical films.

Typically, during laser irradiation operations, a portion of the laser energy penetrates completely through the work piece and is incident to the underlying support surface. A problem with stainless steel support surfaces is that stainless steel will tend to absorb a significant portion such incident laser radiation, leading to a build up of temperature that can damage the stainless steel support or sheet material being converted. For example, the polymeric nature of many optical films makes them susceptible to becoming overheated which can disrupt the fine structures therein which must be maintained to obtain desired optical performance.

Gold is significantly more reflective than steel thus the gold facing layer shields the underlying stainless steel backing during laser radiation, thereby reducing buildup of heat and minimizing damage to the support member and optical film supported thereon. Gold is a more effective infrared reflector, e.g., exhibiting a reflectivity of about 99% at wavelengths of about 10 microns as compared to about 80% for stainless steel. Second, gold is an effective thermal conductor, thus it effectively conducts heat from the laser cutting process to be conducted away from the target zone, thereby reducing the undesirable effects of residual heat on the work piece as well as reducing the likelihood of formation of belt damaging hot spots.

Because of gold's relatively high surface energy, debris generated in the laser converting cutting process may tend to stick to the surface of the support member. In the case of belt configurations, when this portion of the belt moves back into position, such debris may tend to be transferred to the fresh film being converted. Even if the debris does not transfer from the belt to the subsequent work piece, it will tend to absorb laser energy and may lead to local damage of the belt or subsequent work piece.

Accordingly, it will typically be preferred to clean the belt as well as to impart a lower surface energy property to the work surface.

Figure 4:
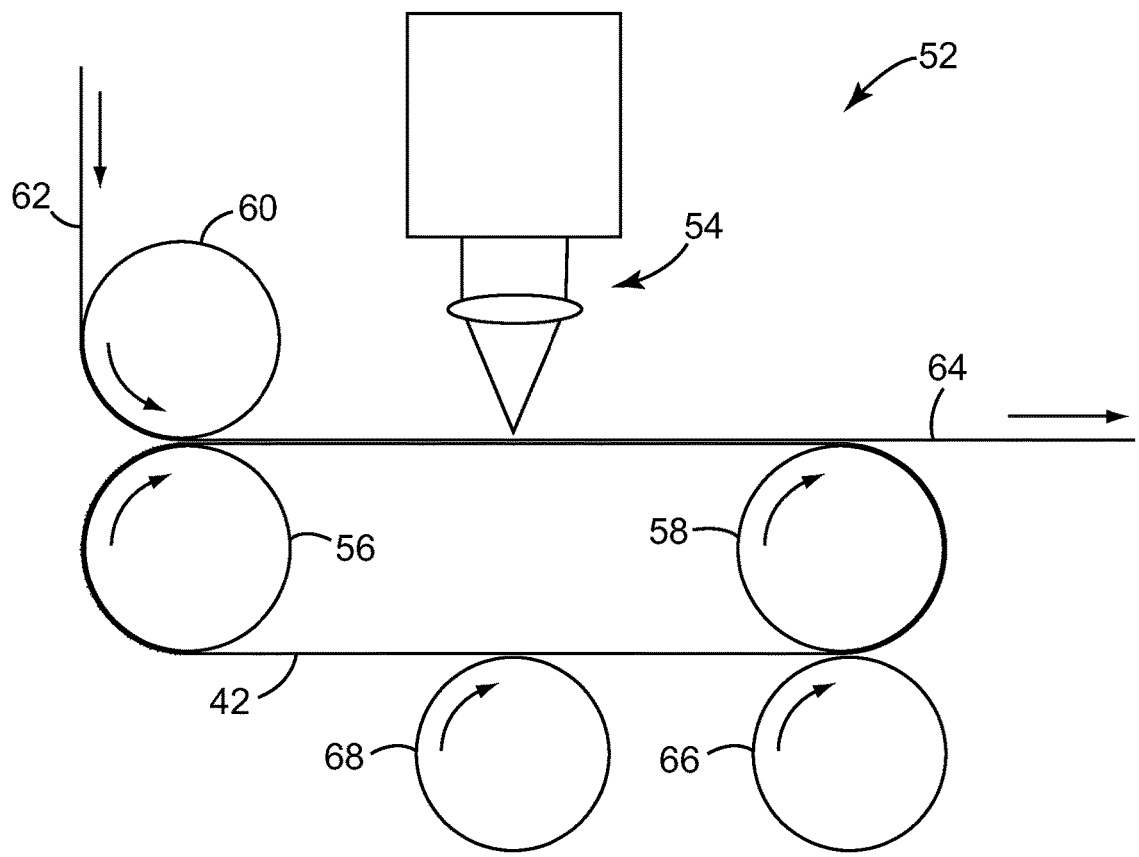
FIG. 4 is a schematic of an illustrative laser converting process and apparatus of the invention.

Because gold is substantially chemically inert, it can typically be easily cleaned with application of solvent or other detergent to clean debris therefrom. As shown in FIG. 4, in a preferred embodiment the apparatus 52 will comprise a wet cleaning roll 66 and a dry roll 68 to clean the supporting member 42. The clean roll rotates in the opposite direction to the belt, providing a brushing action as well as applying the selected wet cleaning agent. In the configuration shown, the dry roll also serves as a tension roll to the belt to keep the laser converting portion flat.

In some embodiments, an optional outer layer 50 may be applied to the exposed face of support member 42 covering gold facing layer 48. For instance, a suitable low surface energy layer may be used used to enhance the cleanability and other physical properties of the surface.

In some embodiments, a diamond like glass coating such as is disclosed in U.S. Pat. No. 6,696,157 (David et al.) is provided on the front face of support member as an outer layer. Such coatings can impart physical durability to the support member. Due to the highly transmissive character in which they can be made they do not interfere with the desired interaction between the laser radiation and underlying gold facing layer.

Other illustrative examples of optional lower surface energy outer layers include thin polyethylene films. Such materials are low cost and can exhibit low absorbtion of the laser radiation. Support members with such optional coatings can be readily reconditioned through removal and replacement of the low surface energy layer.

It has been observed that providing a fine texture to the surface of the backing, e.g., brushing the stainless steel, before application of the gold facing layer and other layers thereto tends to reduce the degree of specular reflection provided by the resultant support member (by increasing the degree of backscatter), thereby resulting in attainment of cleaner cutting action.

In some embodiments, the support member will be substantially continuous. In some embodiments, the support member will have a number channels therein, i.e., passing through the backing, gold facing layer, etc., to permit application of a vacuum to hold the sheet material securely on the support member in flat, still position during the laser radiation.

Laser Converting Apparatus

A schematic diagram of an illustrative continuous laser converting apparatus of the invention in operation is shown in FIG. 4.

In this embodiment, the support member 42 is a stainless steel belt having a gold facing layer in accordance with the invention. Support member 42 is configured as a continuous belt held under tension and advanced by rollers 56, 58.

Optical film 62 is provided and passed under nip roller 60 to be firmly and flatly seated on support member 42. Support member 42 with optical film 62 thereon advances past laser radiating station 54, i.e., the target position where laser radiation is directed at the sheet material to cut it as desired. The optical film may be provided in any desired configuration, e.g., a continuous roll, precut sheets or chips, etc.

The laser is selected to provide a suitable radiation for cutting the optical film or other sheet material being cut. As will be understood, either or both the laser source and film may be moved relative to one another obtain the desired cutting pattern.

After cutting, converted optical film 64, e.g., desireably shaped and sized pieces, are transported to further processing, incorporation in other products, etc.

Support member 42 advances past cleaning roll 66. In the embodiment shown cleaning roll 66 turns counter to the direction of support member 42 so as to provide effective cleaning action and remove debris therefrom. Cleaning roll 66 may apply liquid solvents or other suitable cleaning agents to more effectively clean the surface of support member 42. Following cleaning roll 66, support member passes contact with drying roll 68, e.g., a soft surface, which removes remaining debris, dirt, and cleaning agent from support member 42. Suitable alternative cleaning mechanisms will be apparent to those skilled in the art.

Film Body

Figure 2:
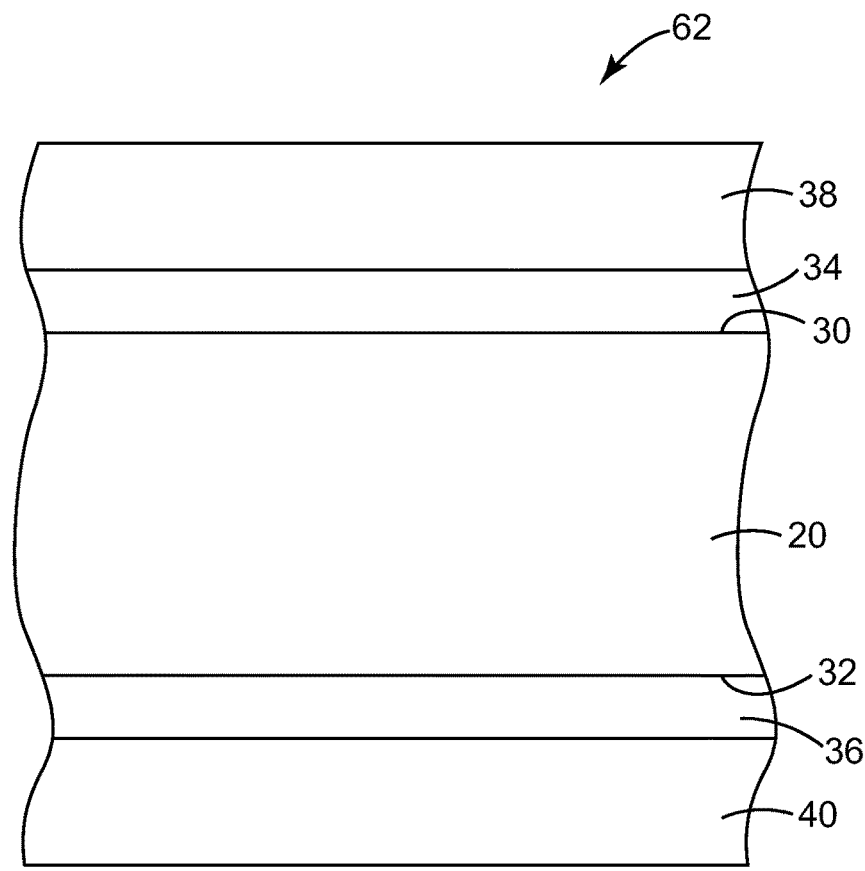
FIG. 2 is a cross sectional view of a portion of an illustrative multilayer optical film body.

Film bodies used in the present invention include those comprising a multilayer optical film or stack having first and second major surfaces and a polymeric skin layer on at least one, and typically on both, of the major surfaces. The film bodies will typically further comprise a premask layer on the outside of the skin layer(s). An illustrative embodiment is shown in FIG. 2. The film and skin layer have different absorbance spectra which makes laser converting problematic.

As used herein, "multilayer optical film" refers to an extended optical body whose thickness is generally no more than about 0.25 mm (10 thousandths of an inch, or mils). In some instances a film can be attached or applied to another optical body such as a rigid substrate or another film having suitable reflection or transmission properties. The film can also be in a physically flexible form, whether it is free-standing or attached to other flexible layer(s).

Figure 1:
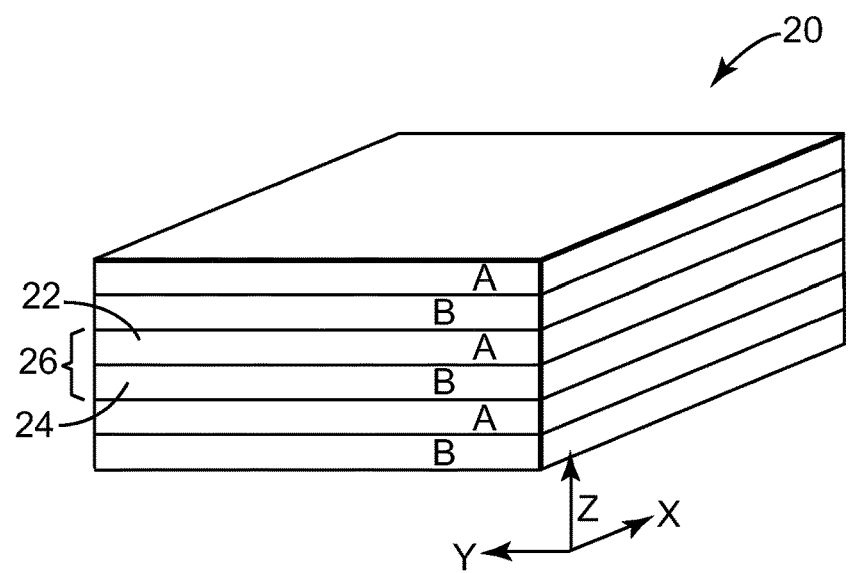
FIG. 1 is a greatly magnified perspective view of an illustrative multilayer optical film.

FIG. 1 depicts an exemplary multilayer optical film 20 for use in the present invention. The film comprises a plurality of individual microlayers 22, 24. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. However, thicker layers can also be included, such as skin layers at the outer surfaces of the film, or protective boundary layers disposed within the film that separate packets of microlayers. Multi-layer optical film 20 can also comprise one or more thick adhesive layers to bond two or more sheets of multilayer optical film in a laminate.

The reflective and transmissive properties of multilayer optical film 20 are a function of the refractive indices of the respective microlayers. Each microlayer can be characterized at least at localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively (see FIG. 1). In practice, the refractive indices are controlled by judicious materials selection and processing conditions. Film body 20 can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. In order to achieve high reflectivities with a reasonable number of layers, adjacent microlayers preferably exhibit a difference in refractive index $\Delta n_x$) for light polarized along the x-axis of at least 0.05. If the high reflectivity is desired for two orthogonal polarizations, then the adjacent microlayers also preferably exhibit a difference in refractive index $\Delta n_y$) for light polarized along the y-axis of at least 0.05. Otherwise, the refractive index difference $\Delta n_y$ can be less than 0.05 and preferably about 0 to produce a multilayer stack that reflects normally incident light of one polarization state and transmits normally incident light of an orthogonal polarization state.

If desired, the refractive index difference ($\Delta n_z$) between adjacent microlayers for light polarized along the z-axis can also be tailored to achieve desirable reflectivity properties for the p-polarization component of obliquely incident light. For ease of explanation in what follows, at any point of interest on an interference film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be nonnegative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles, the z-index mismatch $\Delta n_z$ between microlayers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Exemplary materials that can be used in the fabrication of polymeric multilayer optical film can be found in PCT Publication WO 99/36248 (Neavin et al.). Desirably, at least one of the materials is a polymer with a stress optical coefficient having a large absolute value. In other words, the polymer preferably develops a large birefringence (at least about 0.05, more preferably at least about 0.1 or even 0.2) when stretched. Depending on the application of the multilayer film, the birefringence can be developed between two orthogonal directions in the plane of the film, between one or more in-plane directions and the direction perpendicular to the film plane, or a combination of these. In special cases where isotropic refractive indices between unstretched polymer layers are widely separated, the preference for large birefringence in at least one of the polymers can be relaxed, although birefringence is still often desirable. Such special cases may arise in the selection of polymers for mirror films and for polarizer films formed using a biaxial process, which draws the film in two orthogonal in-plane directions. Further, the polymer desirably is capable of maintaining birefringence after stretching, so that the desired optical properties are imparted to the finished film. A second polymer can be chosen for other layers of the multilayer film so that in the finished film the refractive index of the second polymer, in at least one direction, differs significantly from the index of refraction of the first polymer in the same direction. For convenience, the films can be fabricated using only two distinct polymer materials, and interleaving those materials during the extrusion process to produce alternating layers A, B, A, B, . . . as shown in FIG. 1. Interleaving only two distinct polymer materials is not required, however. Instead, each layer of a multilayer optical film can be composed of a unique material or blend not found elsewhere in the film. Preferably, polymers being coextruded have the same or similar melt temperatures.

Exemplary two-polymer combinations that provide both adequate refractive index differences and adequate interlayer adhesion include: (1) for polarizing multilayer optical film made using a process with predominantly uniaxial stretching, PEN/coPEN, PET/coPET, PEN/sPS, PET/sPS, PEN/EASTAR™ and PET/EASTAR™ where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, inchessPSinches refers to syndiotactic polystyrene and its derivatives, and EASTAR™ is a polyester or copolyester (believed to comprise cyclohexanedimethylene diol units and terephthalate units) commercially available from Eastman Chemical Co.; (2) for polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/ECDEL™ PET/ECDEL™ PEN/sPS, PET/sPS, PEN/coPET, PEN/PETG, and PEN/THV™ where "PMMA" refers to polymethyl methacrylate, ECDELTM is a thermoplastic polyester or copolyester (believed to comprise cyclohexanedicarboxylate units, polytetramethylene ether glycol units, and cyclohexanedimethanol units) commercially available from Eastman Chemical Co., and THV™ is a fluoropolymer commercially available from 3M Company.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

In a simple embodiment, the microlayers can have thicknesses corresponding to a ¼-wave stack, i.e., arranged in optical repeat units or unit cells each consisting essentially of two adjacent microlayers of equal optical thickness (f-ratio=50%), such optical repeat unit being effective to reflect by constructive interference light whose wavelength .lamda. is twice the overall optical thickness of the optical repeat unit. Such an arrangement is shown in FIG. 1, where microlayer 22 of polymer A adjacent to microlayer 24 of polymer B forms a unit cell or optical repeat unit 26 that repeats throughout the stack. Thickness gradients along a thickness axis of the film (e.g., the z-axis) can be used to provide a widened reflection band. Thickness gradients tailored to sharpen such band edges can also be used, as discussed in U.S. Pat. No. 6,157,490 (Wheatley et al.).

Other layer arrangements, such as multilayer optical films having 2-microlayer optical repeat units whose f-ratio is different from 50%, or films whose optical repeat units consist essentially of more than two microlayers, are also contemplated. These alternative optical repeat unit designs can reduce or eliminate certain higher-order reflections. See, e.g., U.S. Pat. No. 5,360,659 (Arends et al.) and U.S. Pat. No. 5,103,337 (Schrenk et al.).

In many embodiments, depending upon the desired application, the optical stack has a thickness from about 2 to about 120 microns (200 nm to 50 mil) and in many embodiments a thickness of about 0.5 mil (12.7 microns) is preferred.

FIG. 2 shows an illustrative film body of the invention comprising multilayer optical stack 20, having first major surface 30 and second major surface 32. In this embodiment, the film body comprises two polymeric skin layers 34, 36 on major surfaces 30, 32, and further comprises optional premask layers 38, 40. In an illustrative embodiment, the optical stack comprises 50% low melt PEN and 50% PETG and is 0.5 mil thick, the skin layers comprises SA115 polycarbonate and are 0.2 mil thick, and the premask comprises polyethylene and is 31 microns thick.

Skin layers, typically comprising polycarbonate or polycarbonate blends, are used on at least one and typically both sides of the optical stack during manufacturing, handling, converting, etc. of the film and use in the final application. The robust physical performance of such films protects the optical stack from degradation such that desired optical performance properties are maintained.

In many instances, a premask layer is provided on the outside of the skin layer(s). Illustrative examples include polyethylene (e.g., LDPE, MDPE, and HDPE) and polyurethane materials to cover the skin layer (which along with the optical stack typically becomes part of the final article) during fabrication. Polyethylene is typically preferred as it is relatively low cost and flexible. Because of its troublesome response to cutting by laser, if a polyester premask is used it is often removed, e.g., peeled back, during laser converting in accordance with the invention.

EXAMPLES

The invention will be further described with reference to the following illustrative examples.

Illustrative support members were made as described below and then exposed to laser radiation such as might be used in converting operations to evaluate the susceptibility to damage from the laser radiation.

Example 1

The two samples of gold-coated steel belt support members were fabricated using a KDF 603 sputtering unit. This unit has a 13 inch×13 inch substrate platen which passes horizontally in front of the sputtering targets. This is commonly referred to as "side sputtering", since the targets point neither up nor down, but instead to the side. The sputtering target was a split target with two separate power connections. One side is a half-width titanium target, and the other is a half-width gold target.

Two steel belt samples were each cleaned with acetone and IPA prior to deposition, to remove any surface oils. The samples were each attached to the platen using KAPTON™ Tape. Each sample was run separately. After cleaning, the sample was placed in the load lock which was then evacuated using a mechanical pump. The sample platen was then transferred to the main chamber, where it was pumped by a cryopump until the main chamber reached its base pressure. For both samples, the base pressure prior to titanium deposition was $7.1 \times 10^{-6}$ Torr, and base pressure prior to gold deposition was $5.9 \times 10^{-6}$ Torr.

Specific deposition conditions were as follows:
Titanium deposition:
 1. Titanium target was pre-sputtered for 2 minutes at 1 kW
 2. A single scan pass was used at a speed of 51 cm/min (gives 175 Å).
 3. Argon gas flow: 70 standard cubic centimeters per minute or sccm (setting)/(68 sccm, actual)
 4. Gas pressure: 6.5 mT
 5. Target voltage: 570V
Gold deposition:
 1. Gold target was pre-sputtered for 15 seconds at 1 kW
 2. 2 scan passes (1500 Å) or 4 passes (3000 Å) were done at a speed of 51 cm/min
 3. Argon gas flow: 50 sccm (setting)/48 sccm (actual)
 4. Gas pressure: 4.6 mT
 5. Target voltage: 587V The buffer layer is titanium (coated in one pass, or about 75 nm in thickness). The thickness of gold is 300 nm (4 passes). In this experiment, no low surface energy layer was formed on top of the gold facing layer.

A portion of the stainless steel was uncoated so that the effects of the laser radiation on the conventional stainless steel support surface could be compared.

Using a Coherent E-400 laser, the support member was exposed to several different radiation conditions. The laser is delivered to a GSI scanner, the focused spot size estimated to be about 250 microns. Each scanner line is set at condition of laser pulse repetition rate (100 kHz, or 1 kHz), line scan speed (i.e., 100 mm/s), and laser pulse duty cycle. With this laser, 100 kHz is very close to continuous wave (CW) mode, while 1 kHz pulse repetition rate is close to pulse mode. The laser outputs are shown in table 1.

TABLE 1

| | 1 kHz | | 100 kHz | |
|---|---|---|---|---|
| Duty Cycle | Average Power (W) | Single pulse energy (mJ) | Average Power (W) | Single pulse energy (mJ) |
| 1% | 3.7 | 3.7 | | |
| 5% | 53 | 53 | | |
| 10% | 115 | 115 | | |
| 15% | 172 | 172 | | |
| 20% | 224 | 224 | 151 | 1.51 |
| 25% | 270 | 270 | 207 | 2.07 |
| 30% | 320 | 320 | 253 | 2.53 |
| 40% | 386 | 386 | 338 | 3.38 |
| 50% | 431 | 431 | 401 | 4.01 |
| 60% | 483 | 483 | 456 | 4.56 |
| 70% | 503 | 503 | 464 | 4.64 |

It was observed that the single pulse energy and laser power parameters determined threshold at which the support member would undergo damage. At high repetition rate (100 kHz) or quasi-CW mode, the stainless steel starts to undergo damage at 253 W and 150 mm/s scanning speed. When the laser scanning line speed was gradually decreased while maintaining the laser power (i.e., at 253 W), severe damage to the stainless steel occured, but the damage stopped when reaching the gold facing layer. When radiated at the slower speed of 30 mm/s, the stainless steel is deformed even on the back surface, but there was still no damage to gold coated portion. Damage to the gold facing layer was observed only when the laser power was increased to over 400 Watts (or 50% duty cycle) and 100 mm/s scanning speed.

When the laser is in pulsed mode (i.e., 1 kHz pulse repetition mode), the gold layer was more easily damaged, since the single pulse energy is much higher. The stainless steel surface began to exhibit damage at 115 Watts (10% duty cycle), while the gold facing layer started to be damaged at 224 Watts (20% duty cycle). Thus, the gold facing layer substantially increased the damage threshold.

Example 2

In this example, a low surface energy layer was applied to the stainless steel without a gold facing layer. Two different coatings were used, namely, (1) Diamond like carbon ("DLC", hydrogenated amorphous carbon, or a —C:H) and (2) fluorinated diamond-like carbon ("FDLC"). The coatings were each applied with a PLASMA-THERM™ Reactive Ion Etcher.

The DLC on stainless steel was done with the following steps:

Step 1: Treated in oxygen plasma for 60 seconds at a flow rate of 500 sccm and power of 2000 Watts.
Step 2: An amorphous silicon carbide tie layer was deposited from tetramethylsilene (TMS) vapor for 30 seconds at a flow rate of 150 sccm and power of 2000 Watts. The resulting a —Si:C:H (hydrogenated amorphous silicon carbide) coating is about 100 nm thick.
Step 3: A diamond like carbon film was deposited from butane gas for 120 seconds at a flow rate of 200 sccm and power of 2000 Watts. The resulting DLC coating is about 250 nm thick.

The FDLC coating was done with the following steps:
Step 1: same
Step 2: same
Step 3: FDLC was deposited for 120 seconds from a mixture of butane and perfluoropropane gases at flow rate of 200 sccm and 100 sccm respectively and power of 2000 Watts.

The resulting FDLC coating thickness is about 300 to 400 nm.

Without the gold facing layer, the lower surface energy layer was damaged far earlier than even the uncoated stainless steel layer. At 238 W laser power, CW mode, and 150 micron focus, both the DLC and FDLC coating started to damage at 5000 mm/sec scanning speed, while the stainless steel underwent damage at speeds slower than 2500 mm/s.

Example 3

In this example, a support member with a 150 nm thick gold facing layer and same buffer layer as in Example 1 was used.

An Amorphous Fluorinated Silicon Carbide (a—Si:C:F:H) release coating was applied over the gold layer with the following steps:
Step 1: Silicon carbide tie layer was deposited from tetramethylsilane (TMS) vapor for 30 seconds at a flow rate of 150 sccm and power of 200 Watts. The resulting SiC layer was about 20 nm thick.
Step 2: Fluorinated silicone carbide was deposited by mixing tetramethylsilane (TMS) and perfluoropropane ($C_3F_8$) gases at flow rate of 150 sccm each for 10 seconds at a power of 200 Watts. The resulting fluorinated silicone carbide layer was about 40 nm thick.
Step 3: Fluorinated carbon was deposited from perfluoropropane at a flow rate of 150 sccm for 20 seconds at a power of 200 Watts.

Similar to Example 1, the support member was laser radiated with a laser focused spot size of about 250 microns both at the pulsed mode (1 kHz) and quasi-continuous mode (100 kHz). At 100 kHz and 253 Watts laser power (30% duty cycle), marking of the stainless steel was observed at laser scanning speed of about 1000 mm/s. In contrast, no marking on the gold facing layer was observed even at a scanning speed of less than about 50 mm/s.

At 1 kHz repetition rate, damage to the uncoated stainless steel belt was observed when the laser was at 53 Watts (5% duty cycle) and 200 mm/s. At 200 mm/s scanning speed, the damage to the gold facing layer was not observed until the laser power was raised to above than 224 Watts (20% duty cycle). The damage threshold on the gold facing layer was similar to that without the low surface energy coating.

Example 4

In this example, a support member with a 300 nm thick gold facing layer and same buffer layer as in Example 1 was used.

A low surface energy coating, i.e., FOMBLIN™ Terminated Diamond-Like-Glass (a-Si:C:H:O, or hydrogenated oxysilicon carbide) was coated with the following steps:
Step 1: $O_2$ plasma for 60 seconds at a flow rate of 500 sccm and power of 500 Watts.
Step 2: Tetramethylsilane (TMS) vapor plasma at flow rate of 150 sccm for 10 seconds at a power of 500 Watts, resulting 15 nm thick TMS.
Step 3: $O_2$ plasma for 60 seconds at a flow rate of 500 sccm and power of 500 Watts to prepare the DLG surface for subsequent grafting of fomblin-silane to the DLG.
Step 4: The oxygen plasma treated DLG film was subsequently dipped in fomblin-silane solution (3M™ NOVEC™ Electronic Coating EGC-1770 available from 3M) and baked in oven at 250° C. for 5 minutes, resulting 10 to 20 nm thick a —Si:C:H:O coating.

This embodiment was found to provide the best release capability compared to the other three.

When exposed to laser radiation, with a laser focused spot size of about 250 microns, at 100 kHz and 253 Watts laser power (30% duty cycle), laser mark on the stainless steel surface (with DLC coating) was observed when the laser scanning speed is about 200 mm/s. In contrast, no marking on the gold facing layer portion was observed even when the scanning speed was less than about 100 mm/s.

At 1 kHz repetition rate, damage to the non-gold portion of the belt was observed when the laser was at 115 Watts (10% duty cycle) and 200 mm/s. In contrast, at 200 mm/s scanning speed, no damage to the gold coated portion was observed until the laser power was higher than 270 Watts (25% duty cycle). The damage threshold on the gold facing layer was similar to that without the low surface energy coating.

From these examples, it was apparent that use of the gold facing layer dramatically increased the damage threshold of the belt.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. All of the patents and patent applications cited herein are incorporated by reference in their entirety.

What is claimed is:

1. An apparatus for laser converting sheet material, the apparatus comprising a support member having a gold facing layer and a laser radiating station that emits laser radiation suitable for cutting the sheet material, wherein the support member is configured to support a sheet material in a dimensionally and configurationally stable flat configuration in target position to the laser radiating station such that the sheet material is positioned in direct contact with the support member between the contact member and the laser radiating station such that the gold facing layer is in the entire path of laser radiation which passes through the sheet material.

2. An apparatus for laser converting sheet material, the apparatus comprising a support member having a gold facing layer and a laser radiating station that emits laser radiation suitable for cutting the sheet material, wherein the support member is configured to support a sheet material in a dimensionally and configurationally stable flat configuration in target position to the laser radiating station such that the sheet material is positioned in direct contact with the support member between the contact member and the laser radiating station such that the gold facing layer is in the path of laser radiation which passes through the sheet material, wherein the support member is a continuous belt.

3. The apparatus of claim 1 wherein the support member comprises a backing member.

4. The apparatus of claim 1 wherein the support member comprises a stainless steel backing member.

5. The apparatus of claim 4 wherein the support member comprises, in order on the first face of the backing member, a tie layer, an optional hardness enhancement layer, a buffer layer, a gold facing layer, and a transmissive low surface energy coating.

6. The apparatus of claim 5 wherein the tie layer comprises at least one of titanium nitride, zirconium nitride, and titanium aluminum nitride, and combinations thereof.

7. The apparatus of claim 1 wherein the support member has vacuum channels therethrough.

8. A method of laser converting sheet material comprising
 (1) providing an apparatus of claim 1;
 (2) providing the sheet material; and
 (3) directing laser radiation at the sheet material to form cuts in the sheet material.

9. The apparatus of claim 2 wherein the support member comprises a backing member.

10. The apparatus of claim 2 wherein the support member comprises a stainless steel backing member.

11. The apparatus of claim 10 wherein the support member comprises, in order on the first face of the backing member, a tie layer, an optional hardness enhancement layer, a buffer layer, a gold facing layer, and a transmissive low surface energy coating.

12. The apparatus of claim 11 wherein the tie layer comprises at least one of titanium nitride, zirconium nitride, and titanium aluminum nitride, and combinations thereof.

13. The apparatus of claim 2 wherein the support member has vacuum channels therethrough.

14. A method of laser converting sheet material comprising
 (1) providing an apparatus of claim 2;
 (2) providing the sheet material; and
 (3) directing laser radiation at the sheet material to form cuts in the sheet material.

* * * * *